US007929942B2

(12) United States Patent
Schefczik et al.

(10) Patent No.: US 7,929,942 B2
(45) Date of Patent: Apr. 19, 2011

(54) COMPLETING EMERGENCY CALLS OVER A NETWORK WITH A MALFUNCTIONING BACKHAUL COMMUNICATIONS LINK

(75) Inventors: Peter Hans Schefczik, Erlangen (DE); Georg Fischer, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1430 days.

(21) Appl. No.: 11/385,034

(22) Filed: Mar. 20, 2006

(65) Prior Publication Data
US 2007/0218868 A1    Sep. 20, 2007

(51) Int. Cl.
H04M 11/04   (2006.01)
H04W 40/00   (2009.01)
H04W 24/00   (2009.01)

(52) U.S. Cl. .................... 455/404.1; 455/423; 455/445

(58) Field of Classification Search ............ 455/404.1, 455/412.1, 413, 417, 423, 422.1, 424, 554.2, 455/445, 11.1, 8, 56, 1; 340/539.1, 539.11, 340/286.01, 286.02
See application file for complete search history.

(56) References Cited

U.S. PATENT DOCUMENTS

| | | | | |
|---|---|---|---|---|
| 5,546,397 A | * | 8/1996 | Mahany | 370/85.1 |
| 6,628,933 B1 | * | 9/2003 | Humes | 455/404.1 |
| 7,020,436 B2 | * | 3/2006 | Schmutz | 455/9 |
| 7,184,744 B1 | * | 2/2007 | Schnabel | 455/404.2 |
| 7,336,172 B2 | * | 2/2008 | Govindaraj | 340/541 |
| 7,336,626 B1 | * | 2/2008 | Barratt et al. | 370/281 |
| 7,433,672 B2 | * | 10/2008 | Wood | 455/404.1 |
| 7,508,754 B1 | * | 3/2009 | Sankaranaraynan et al. | 370/225 |
| 7,542,721 B1 | * | 6/2009 | Bonner et al. | 455/41.2 |
| 7,606,574 B2 | * | 10/2009 | Classon et al. | 455/450 |
| 7,706,803 B2 | * | 4/2010 | Benco et al. | 455/445 |
| 2005/0048945 A1 | * | 3/2005 | Porter | 455/404.1 |
| 2006/0009191 A1 | * | 1/2006 | Malone | 455/404.1 |
| 2006/0052124 A1 | * | 3/2006 | Pottenger et al. | 455/515 |
| 2006/0077053 A1 | * | 4/2006 | Park et al. | 340/521 |
| 2006/0171394 A1 | * | 8/2006 | Seid et al. | 370/393 |
| 2006/0211404 A1 | * | 9/2006 | Cromp et al. | 455/405 |
| 2006/0227767 A1 | * | 10/2006 | Johnson et al. | 370/356 |
| 2007/0030809 A1 | * | 2/2007 | Dayama | 370/237 |
| 2007/0155375 A1 | * | 7/2007 | Kappel et al. | 455/422.1 |
| 2007/0160019 A1 | * | 7/2007 | Classon et al. | 370/338 |

FOREIGN PATENT DOCUMENTS

WO    WO 2006/086906    *    8/2006

OTHER PUBLICATIONS

International Search Report and Written Opinion mailed Nov. 30, 2007.*

* cited by examiner

*Primary Examiner* — George Eng
*Assistant Examiner* — Brandon J Miller
(74) *Attorney, Agent, or Firm* — Williams, Morgan & Amerson

(57) ABSTRACT

A method and an apparatus are provided for enabling a wireless communication over a network in response to an indication of an emergency. The method comprises causing a base station to provide a wireless backhaul link in an uplink frequency band for further sending a call over the network in response to the call associated with the emergency. Reconfiguration enables turning a base station or base station router into a high power terminal. In this way, emergency calls may be completed over a network having at least one malfunctioning backhaul communications link in a network backbone.

13 Claims, 3 Drawing Sheets

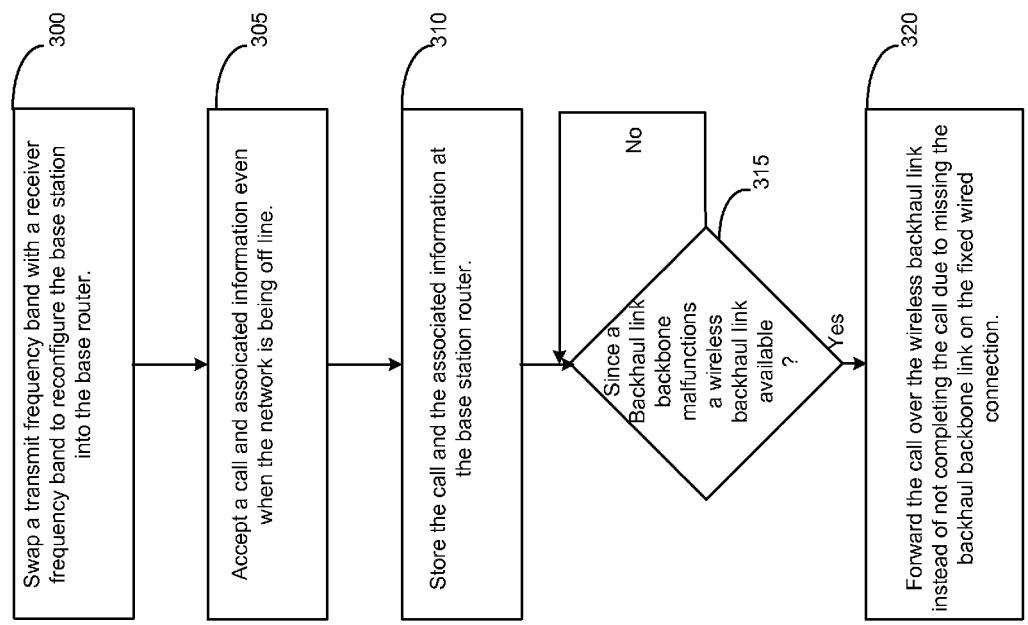

COMPLETING EMERGENCY CALLS OVER A NETWORK WITH A MALFUNCTIONING BACKHAUL COMMUNICATIONS LINK

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to various users or subscribers of wireless communication devices. The wireless communication devices may be mobile or fixed units and situated within a geographic region across one or more wireless networks. The users or subscribers of wireless communication devices, such as mobile stations (MSs) or access terminals or user equipment may constantly move within (and outside) particular wireless networks.

A wireless communications system generally includes one or more base stations (BSs) that can establish wireless communications links with mobile stations. Base stations may also be referred to as node-Bs or access networks. To form the wireless communications link between a mobile station and a base station, the mobile station accesses a list of available channels/carriers broadcast by the base station. To this end, a wireless communications system, such as a spread spectrum wireless communications system, may allow multiple users to transmit simultaneously within the same wideband radio channel, enabling a frequency re-use based on a spread spectrum technique.

Many cellular systems, for example, spread-spectrum cellular systems use a Code division multiple access (CDMA) protocol to transmit data in a wireless network consistent with a desired standard, such as IS-95, CDMA2000 or Universal Mobile Telecommunication System (UMTS) based wideband-CDMA (WCDMA). A spread-spectrum cellular system generally provides transmissions associated with one or more mobile stations that a base station may be serving on the downlink (a.k.a. forward (FL) link). As such, transmissions from the mobile stations to the base station may occur on the uplink (a.k.a. reverse link (RL)). Likewise, on the reverse link (RL), one or more mobile stations may communicate with a base station serving the mobile stations.

For establishing a wireless communication in a cellular system, a base station (BS) schedules the transmissions of the various mobile stations (MSs) that it is serving on the MS-to-BS (reverse or uplink link, RL). To this end, a base station may provide channels that have different capabilities to the mobile stations on the BS-to-MS link (forward link or downlink, FL). For example, a base station may provide channels that operate according to a desired protocol and provides a number of air interfaces to traffic channels, control channels, and access channels. Mobile stations may establish wireless communications links with the base station using one of the channels. In particular, for Third Generation Project Partnership (3GPP) standard, access terminals (AT) or more generically mobile stations (MS) use pilot strength to select forward link (AN-AT link) data rates via data rate control (DRC) messages on the Reverse Link (RL). A rate value is fed back to an AN or a BS. An AT or the MS sends a request for a data rate to the AN or the BS to transmit at that data rate in the next transmission.

Typically, a backhaul link is used to communicate a wireless communication over a network to complete a call, such as a voice call from a caller to an intended call user. A backhaul link in a network provides a link, for example, between a base station and the Internet, a data center, a central switch, e.g., a mobile switching center (MSC).

Wireless infrastructure is a crucial communication vehicle. However, the entire communication infrastructure may become unusable in case of disasters or other catastrophes if the usual wireline backhaul link is destroyed. Even in cases where a quick wireless infrastructure is needed on the fly, it cannot be installed easily if the backhaul infrastructure is not working or simply was not present before.

Many wireless networks consist of a hierarchical collection of network including a base station, a controller, a switching center and routers and their connection to a fixed network using coax, optical or microwave links. Real time services like voice calls cease to complete if a connection of a base station to a fixed network is lost or malfunctions. Full service is only possible if a physical connection still exists. This is particularly the case for real-time services like emergency calls, but also for delivery of non real-time services like Short Message Service (SMS) or other E-messages.

During failures of the communication infrastructure of a wireless network phone calls cannot be placed, messages cannot be delivered or sent and information cannot be received by a mobile phone user in a particular failure area. Even if a base station has power back-up, this does not help in case a link to the rest of the network is absent. This is why in case of disasters like earthquakes, flood, storms or other incidents the destroyed infrastructure may not enable completion of phone calls even if the base station still continues to operate as intended without any backhaul connectivity. That is, conventional mobiles may not function in various scenarios listed above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for enabling a wireless communication over a network in response to an indication of an emergency. The method comprises causing a base station to provide a wireless backhaul link in an uplink frequency band for further sending a call over the network in response to the call associated with the emergency.

BRIEF DESCRIPTION OF THE DRAWINGS

The invention may be understood by reference to the following description taken in conjunction with the accompanying drawings, in which like reference numerals identify like elements, and in which:

FIG. 3 depicts a stylized representation for implementing a method of reconfiguring a base station and/or the base station router into a terminal consistent with one exemplary embodiment of the present invention.

Figure 1:
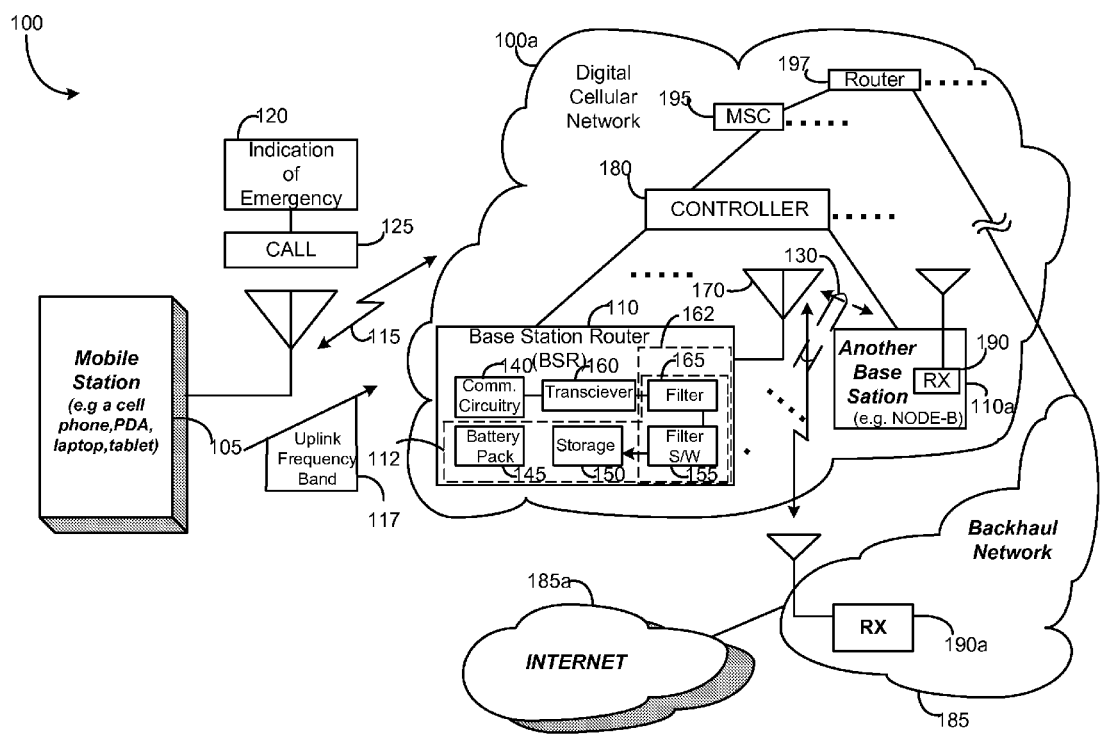
FIG. 1 schematically depicts a wireless network in which a base station or a base station router enables wireless communication in response to an indication of emergency according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for accepting, storing and forwarding emergency calls and other information off-line even in cases where a fixed backbone network malfunctions. A Base Station Router (BSR) includes a flexible filter apparatus to turn the base station router into a high-powered terminal capable of wirelessly transmitting at a transmit power that may overcome an absent or malfunctioning backhaul link using a wireless backhaul link if and when desired the filter apparatus. The base station router may enable services for a wireless device by using the filter apparatus. One application of the base station router may be providing security and completing voice calls even when a fixed, wired backhaul link to a backbone network becomes unavailable. A UMTS standard compliant base station router may comprise UMTS software and circuitry in a box system, which may be equipped with a battery pack and a storage device to form a stand alone unit. The UMTS-based base station router may allow an operator to offer emergency backup services without a backbone network. A standalone base station router relies on the battery and the storage device for use in catastrophic or other situations that leaves other infrastructure inoperational. Particularly, in absence of a wired link up to a backhaul network, the base station router may enable accepting, storing and forwarding of emergency calls or messages from conventional mobile phones, such as GSM or UMTS compliant phones. By storing a voice call on a local disk or random access memory (RAM) as long as an appropriate backhaul link becomes available, the battery backed base station router may upload the collected information using, e.g., a Very Small Aperture Terminal (VSAT) connection to a satellite, a WLAN connection to a helicopter, a (Worldwide Interoperability for Microwave Access (WiMAX) connection or even a UMTS link to another base station that has backhaul connectivity intact. A UMTS case described below uses reconfiguration of hardware and/or software for calls (voice messages) or SMS/MMS that may not be delivered in real time. Instead, calls or messages may either be sent up over a VSAT link or a quick upload to a helicopter using WLAN or WiMAX or other wireless connections. While in 3GPP specifications, for example, emergency calls are specified as real time service without authentication, without any time lag and with precedence, a base station router utilizing non real time emergency services may provide numerous benefits and features set forth below:

1. Support of collecting emergency voice calls, storing it and forwarding it when appropriate, even over a non real time backhaul link.
2. Emergency calls may be voice calls, Short Message Service (SMS), Message Service (MMS) or other E-messages like E-mail.
3. Multimedia content (automatic voice calls, SMS, MMS, E-mails, pictures or even video) may be distributed, e.g. in a carousel mode, towards the mobile stations in a coverage with malfunctioning backhaul link.
4. Pictures may be taken of the surroundings of the base station router and sent up together with location-based information.
5. Even if electric supply fails due to natural or man-made calamities, such as bad weather conditions, earthquakes, hurricanes, or water from dyke breaks, a base station router-based emergency device may still remain usable using a built in battery.
6. A base station router 110 may be selectively reconfigured to operate either as a base station or as a terminal.

The base station router may use frequency agile radio frequency (RF) techniques and a baseband that supports swapping of a base station and a terminal protocol stack. Some of the advantages of a base station router-based method of completing emergency calls over a network with a malfunctioning backhaul communication link include:

1. A general scheme for supporting emergency services during catastrophes or other disasters using a base station router architecture with Global System of Mobile Communications (GSM), UMTS or WCDMA protocols.
2. A base station router-based application may not differentiate different standards.
3. A base station router-based apparatus may be economically deployable within a relatively short time frame.
4. A wireline connection to a backbone network may need not be installed.
5. The base station router without modifying existing mobiles may support UMTS, GSM or WCDMA standards.
6. The reach of emergency services may be substantially enhanced, even if links intended to remain operational after a catastrophe fail to support real-time services. For example, SMS and MMS (transfer of pictures) become more important in the emergency situation.
7. Voice messages may be preprocessed, and audio compressed inside the base station router so that only a small amount of data may be transferred, use of low data rate non-real-time links after a disaster.

While Uplink and downlink frequency band are both present at the time; in infrastructure mode the BSR TX operates in downlink and the BSR RX operates in uplink band. When the BSR is reconfigured into a high power terminal than the reconfigured BSR's TX operates now in uplink band and the reconfigured BSRs RX now operates in downlink band. The underlying air interface protocols typically all assume that uplink and downlink are active at the same time.

Essentially the transceivers frequencies for Tx and RX may be reprogrammed. A power amplifier normally transmits at downlink frequencies, then after reconfiguration it operates at uplink frequencies. A duplex filter may be reconfigured also to pass the changed frequency to the antenna.

Referring to FIG. 1, a wireless network 100 is illustrated to include a mobile station 105 and a base station router (BSR) 110 that may enable a wireless communication 115 in response to an indication of emergency 120 according to one illustrative embodiment of the present invention. For example, in response to a call 125 associated with the indication of emergency 120, the base station router 110 may provide a wireless backhaul link 130 in an uplink frequency band 117 for further sending the call 125 over a digital cellular network 100a. The base station router 110 may accept the call 125 and associated information, such as the indication of emergency 120 even when the network 100 is being off line. That is, the base station router 110 may provide a way for the call 125 to complete even when a backhaul link 135 is missing. Examples of the backhaul link 135 include a fixed, wired network link that provides backhaul connectivity.

The base station router 110, in one embodiment, may comprise communication circuitry 140, a battery pack 145, storage 150 to store filter software 155 and other data, a transceiver 160, and a filter 165 coupled to an antenna 170 to communicate with the mobile station 105. The communication circuitry 140 may comprise conventional communication circuits to enable the base station router 110 to communicate with the mobile station 105. The battery pack 145 may supply power to the base station router 110 when the power infrastructure and the backhaul link 135 become inoperational. The storage 150 may store the filter software 155 and any suitable communications software compliant with any one of standards, protocols, specifications suitable for a particular application. The transceiver 160 may provide communications, such as radio frequency (RF) communications over the network 100. The filter 165 may enable a wireless service at the base station router 110 in some embodiments of the present invention. The transceiver 160 may comprise an RF power amplifier that supplies the RF transmit power to the antenna 170 to increase a desired cell range.

The communication circuitry 140 may comprise conventional communication circuits to enable the base station 110 to communicate with the mobile station 105 and to an Internet Protocol (IP) network 182 that may comprise a backhaul network 185, what may couple to Internet backbone 185a. In addition, the communication circuitry 140 may cause the base station router 110 to communicate with a controller 180, such as a radio network controller. The controller 180 may couple to another base station, such as another base station 110a.

While the base station 110a may comprise a receiver (RX) 190, the backhaul network 185 may comprise a receiver 190a. The transceiver 160 of the base station router 110 may communicate wirelessly with the receiver 190. The controller 180 may couple to a mobile switching center (MSC) 195, which in turn, couples to a conventional router 197.

In operation, a base station provided as the base station router 110 a base station may use the filter software 155 to detect the indication of emergency 120. At the base station router 110, in response to the call 125, the base station may enable a stand alone service without the backbone network 185 by storing the call 125 in the storage 150. The filter software 155 may cause the base station router 110 to turn into a high-powered terminal to communicate with another base station such as the base station 110a for forwarding a message in the call 125.

By using the filter software 155, the base station router 110 may store the call 125 and the associated information in the storage 150. For example, the storage 150 may store a voice call on a local disk and/or a random access memory. When the fixed, backbone wired network link 135 indicates a malfunction, the base station router 110 may forward the call 125 over the wireless backhaul link 130. The base station router 110 may deliver call 125 in non-real time using one of a satellite connection, a wireless local area network (WLAN) connection, WiMAX connection and/or a UMTS connection to another base station 110a or base station router 110 having backhaul connectivity. For example, using a CDMA or UMTS protocol, based on an uplink budget, the base station router 110 may enable a desired cell range of transmit power for the wireless backhaul link 130.

The filter software 155 may cause the base station router 110 to operate in one of a base station mode or a mobile terminal mode based on an indication of frequency change. That is, in an emergency situation indicated by the indication of the emergency 120, the base station router 110 may operate selectively in one of at least two different modes. By using the filter 165 and the filter software 155, the base station operates as a stand alone base station router, such as the base station router 110. The base station router 110 provides a terminal that overcomes the malfunction of the fixed, wired backbone network link 135 in one embodiment of the present invention. The terminal may use the filter 165 and the transceiver 160 to operate as the base station router 110, which causes a base station to enable a wireless link, such as the wireless backhaul link 130 instead of providing communications or connectivity for the call 125 over the backhaul link 135

In other words, a filter apparatus 162 comprising the filter 165 and the filter software 155 may cause a base station, such as the base station router 110, to provide the backhaul link 135 in the form of the wireless backhaul link 130. The wireless backhaul link 130 may provide a point-to-point and/or a point-to-multipoint radio frequency communications. To this end, the radio frequency modules including the communication circuitry 140, filter 165, transceiver 160, filter software 155 may the adapted to be frequency agile.

In one embodiment of the present invention, the base station router 110 may distribute emergency related information based on the indication of emergency 120 associated with the call 125 across the network 100. For example, the base station Transceiver 160 may inform a user with an audio announcement regarding storing of the call 125 subsequent to learning of a message.

The base station router 110 may provide wireless connectivity to the mobile station 105 according to any desirable protocol. Examples of a protocol include a code division multiple access (CDMA, CDMA2000) protocol, wideband-CDMA (WCDMA) protocol, a Universal Mobile Telecommunication System (UMTS) protocol, a Global System for Mobile Communications (GSM) protocol.

Examples of the mobile station 105 may include a host of wireless communication devices including, but not limited to, cellular telephones, personal digital assistants (PDAs), and global positioning systems (GPS) that employ the wireless network 100 to operate in a high-speed wireless data network, such as a digital cellular CDMA network. Other examples of the mobile station 105 may include smart phones, text messaging devices, and the like.

Consistent with one embodiment, the mobile station 105 may transmit messages to the base station router 110 over a reverse or uplink link. To enable a user of the mobile station 105 to communicate in the wireless network 100, a radio network controller (RNC) may be coupled to a base station. In a cellular system the wireless communication 115 between the base station router 110 and the mobile station 105 may occur over an air interface 130 via a radio frequency (RF) medium that may use a code division multiple access (CDMA) protocol to support multiple users. A forward or downlink link may provide messages to the mobile station 105. The messages may include traffic packets and signaling messages over a relatively high-speed wireless data network, such as a cellular network.

When moving within a high-speed wireless data network, such as a digital cellular CDMA network, a handover of mobile communications occurs for the mobile station 105 upon a user leaving an area of responsibility of a first cell, namely, into a new cell. This handover may be coordinated by the controller 180. The 180 controller may coordinate the handover of mobile communications upon a user leaving an area of responsibility of a first base station, into a second base station.

To communicate with different base stations, the mobile station 105 may comprise a receiver (RX) and a transmitter (TX). While the receiver may receive transmissions of packet data from the set of base stations, the transmitter may transmit packet data to the set of base stations may be associated with a different cell sector of a base station.

The mobile station 105 may send the feedback on an uplink and/or a reverse link (RL) to the base station router 110 to indicate the value of the revised data rate. The base station router 110 may receive the feedback for data rate control over the reverse link on a data rate control channel (DRC). In response to the feedback associated with the measurement of the primary pilot and/or the secondary pilot.

One example of the high-speed wireless data network includes a digital cellular network based on a CDMA protocol, such as specified by the 3rd Generation (3G) Partnership Project (3GPP2) specifications. The 3G cellular systems provide enhanced voice capacity and support high data rate packet based services. These features are provided in cdma2000 1xEV high rate packet data air system referred to as IS-856. The 3G cellular system cdma2000 1xEV provides high-speed wireless Internet access to mobile users with asymmetric data traffic relative to a cellular system based on IS-95 standard. For example, data rate of a user of the mobile station 105 may vary from 9.6 kbps to 153.6 kbps.

The base station router 110, sometimes referred to as Node-B, may provide connectivity to associated geographical areas within the high-speed wireless data network. The base station router 110 may transmit traffic packets, such as data packets. For example, traffic packets may include voice information, images, video, data requested from an Internet site, and the like. In contrast, signaling messages may be used to provide commands to each mobile station 105 and/or other elements of the wireless network 100. Examples of the signaling messages may include configuration messages, setup instructions, switch instructions, handoff instructions, and the like.

In the wireless network 100, a wireless data network may deploy any desirable protocol to enable wireless communications between the first and second base stations and the mobile stations according to any desirable protocol. Examples of such a protocol include a (CDMA, WCDMA) protocol, a UMTS protocol, a GSM protocol, and like. A radio network controller (RNC) may be coupled to the first and the second base stations and to enable a user of the first and second mobile stations to communicate packet data over a network, such as a cellular network. One example of the cellular network includes a digital cellular network based on a CDMA protocol, such as specified by the 3rd Generation (3G) Partnership Project (3GPP) specifications.

Other examples of such a protocol include a WCMDA protocol, a UMTS protocol, a GSM protocol, and like. The controller 180 may manage exchange of wireless communications between the mobile stations 105 and the first and second base stations according to one illustrative embodiment of the present invention. Although two base stations and one controller 180 are shown in FIG. 1, persons of ordinary skill in the pertinent art having benefit of the present disclosure should appreciate that any desirable number of base station router 110 and radio network controllers 180 may be used.

Each of the base station router 110 and the base station 110a, sometimes referred to as Node-Bs, may provide connectivity to associated geographical areas within a wireless data network. Persons of ordinary skill in the art should appreciate that portions of such a wireless data network may be suitably implemented in any number of ways to include other components using hardware, software, or a combination thereof. Wireless data networks are known to persons of ordinary skill in the art and so, in the interest of clarity, only those aspects of a wireless data network that are relevant to the present invention will be described herein.

According to one embodiment, the mobile station 105 may communicate with an active base station on the reverse link via the controller 180 coupled to the base stations. The mobile station 105 may communicate over the reverse link with the active base station, which is generally referred to as the serving base station or the serving sector. The 3rd Generation Partnership Project (3GPP2) standard defines the role of a serving base station or a serving sector and a serving radio network controller based on 3GPP2 specifications.

In one embodiment, the reverse link and the forward link may be established on a plurality of channels. The channels, such as traffic and control channels may be associated with separate channel frequencies. For example, CDMA channels with associated channel number and frequency may form a wireless communication link for transmission of high-rate packet data. On the reverse link, for example, the mobile station 105 may update the base station router 110 with a data rate to receive transmissions on the traffic channel. The forward link may use a Forward MAC Channel that includes four sub-channels including a Reverse Power Control (RPC) Channel, a Data Rate Control Lock (DRCLock) Channel, ACK channel and a Reverse Activity (RA) Channel.

On the reverse link, the mobile station 105 may transmit on an Access Channel or a Traffic Channel. The Access Channel includes a Pilot Channel and a Data Channel. The Traffic Channel includes Pilot, MAC and Data Channels. The MAC Channel comprises four sub-channels including a Reverse Rate Indicator (RRI) sub-channel that is used to indicate whether the Data Channel is being transmitted on the Reverse Traffic Channel and the data rate. Another sub-channel is a Data Rate Control (DRC) that is used by the mobile station 105 to indicate to the base station router 110 the revised data rate that the traffic channel may support on the best serving sector. An acknowledgement (ACK) sub-channel is used by the mobile station 105 to inform the base station router 110 whether the data packet transmitted on the traffic channel has been received successfully. A Data Source Control (DSC) sub-channel is used to indicate which of the base station sectors should be transmitting forward link data.

In another embodiment, the mobile station 105 may request transmission of packet data, as shown in FIG. 1, from at least two cell sectors associated with one or more of the set of base stations. In one embodiment, the wireless network 100 may be based on a cellular network, which at least in part, may be based on a Universal Mobile Telecommunications System (UMTS) standard. The cellular network may be related to any one of the 2G, 3G, or 4G standards that employ any one of the protocols including the UMTS, CDMA2000, or the like, however, use of a particular standard or a specific protocol is a matter of design choice and not necessarily material to the present invention.

In one embodiment, a conventional Open Systems Interconnection (OSI) model may enable transmission of the packet data and other data including messages, packets, datagram, frames, and the like between the mobile station 105 and the set of base stations. The term "packet data" may include information or media content that has been arranged in a desired manner. The packet data may be transmitted as frames including, but not limited to, a radio link protocol (RLP) frame, signaling link protocol (SLP) frame or any other desired format. Examples of the packet data may include a payload data packet representative of voice, video, signaling, media content, or any other type of information based on a specific application.

One particular scenario may cause the mobile station 105 located at a fixed location within a sector associated with a conventional cell of the wireless network 100 may use the pilot (either primary or secondary depending on whether the mobile station 105 is a legacy or a Revision B type) C/I measurement to generate a DRC value.

Figure 2:
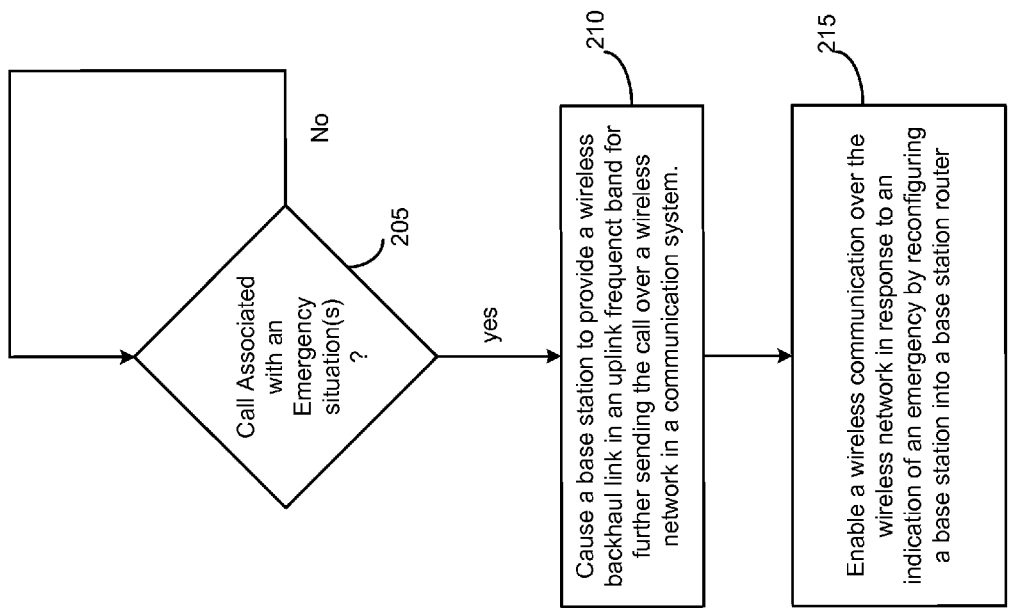
FIG. 2 depicts a stylized representation of a method for implementing an emergency apparatus of the wireless networks shown in FIG. 1 to complete a call using the base station router consistent with one exemplary embodiment of the present invention.

Referring to FIG. 2, a stylized representation of a method for implementing the emergency apparatus 112 for the network 100 to complete the call 125 using the base station router 110 is shown in accordance with one embodiment of the present invention. At a decision block 205, the base station router 110, by using the filter software 155 may detect whether the call 125, such as a voice call in an emergency situation is indicated by the indication of the emergency 120. A check at the decision block 205 may ascertain whether a link to the backbone network 185 is available. If so, the filter software 155 may cause the filter 165 at the base station router 110 to provide a backhaul link, such as the wireless backhaul link 130 for sending the call 125 further over the network 100, and as shown in block 210. For example, the call 125 may be completed to and intended user of a mobile terminal from the mobile terminal 105. In this way, the base station router 110 may enable the wireless communication 115 over the network 100 in response to the indication of emergency 120, as shown in block 215.

Referring to FIG. 3, in stylized representation implementing of a method for reconfiguring a base station 110a or a base station router 110 into a terminal mode base station is schematically illustrated according to one embodiment of the present to invention. At block 300, the filter software 155 may swap the transmit frequency band with the receiver frequency band to reconfigure a base station or the base station router 110 into a terminal. At block 305, the base station router 110 may accept the call 125 and associated information, such as the indication of emergency 120 even when the network 100 is being off line. The base station router 110 may store the call 125 and the indication of emergency 120 at block 310.

In one embodiment, the Base station router (BSR) 110 being a derivate of the base station 110a may use identical frequency bands to the base station 110a. One difference between the two is that base station 110a connects to a radio network controller (RNC) 180, thus may not operate independently and that the BSR 110 connects directly to the Internet 185a without need for an RNC. By reconfiguring, as set forth above, the BSR 110 or the base station 110a may be turned into a high power-terminal. Such terminals may have swapped RX and TX bands compared to BSR/base stations.

By storing a voice call on a local disk or random access memory (RAM) as long as an appropriate backhaul link becomes available, the battery backed base station router 110 may upload the collected information using, e.g., a Very Small Aperture Terminal (VSAT) connection to a satellite, a WLAN connection to a helicopter, a WiMAX connection or even a UMTS link to another base station that has backhaul connectivity intact. A UMTS case described below uses RF reconfiguration in that calls (voice messages) or SMS/MMS may not be delivered in real time. Instead, calls or messages may either be sent up over a VSAT link or a quick upload to a helicopter using WLAN or WiMAX or other wireless connections.

A decision block 315 determines whether the wireless backhaul link 130 is available. If so, when the fixed wired backbone network link 135 indicates a malfunction, i.e., being not available for communication or network connectivity. At block 320, reconfiguration may be performed to tune the base station/BSR into a high power terminal. That is, a reboot of the base station router 110 may be performed for reprogramming the RF modules and protocol stacks. Upon reconfiguration, the base station router 110 may forward the call 125 over the wireless backhaul link 130, as indicated in block 325.

To reconfigure a base station or the base station router 110 into a terminal, the filter software 155 and the radio frequency (RF) modules including the filter 165 may use frequency agile technique, which may enable a radio frequency communication from the base station router 110 being a highly-powered terminal. To swap a transmit frequency band with a receiver frequency band, the base station router 110 may use the transceiver 160. At the base station router 110, upon detecting an availability of the wireless backhaul link 130, the base station router 110 may send call information associated with the call 125 using a satellite connection, a WLAN connection, WiMAX connection and/or a UMTS link to another base station having backhaul connectivity. By using any one of such connections, the base station router 110 may deliver the call 125 in non-real time.

In this way, the base station router 110 and/or the base station 110a may be reconfigured into a terminal, which uses "frequency agility" to swap a transmit frequency band with a receive frequency band. Since the base station router 110 may use a transceiver of higher transmit power and higher sensitivity than a conventional mobile terminal, when the base station router 110 is configured as a terminal, it offers a relative larger cell range, reaching farther away base stations that are still in operation. Especially in the context of CDMA and UMTS systems, a link budget is typically limited by an uplink, an increased terminal transmit power may enable a cell range increase. Terminals typically have transmit powers in the order of 100 mW (20 dBm), whereas base station router 110s typically offers 10 W (40 dBm). So the link budget may improve by at least 20 dB, for example, and additional improvements with an antenna of a base station router 110 may be obtained over a terminal. In particular, a link budget increase by 20 dB may map into a cell radius increase by a factor 3.8.

By incorporating a frequency agile RF technique, a RF system of a base station router 110 may provide a symmetric base station router 110 that may operate either in a base station mode or in a terminal mode. The RF related modules in a base station router 110 may be turned into frequency agile modules, which enable a change in frequencies of operation with a radio, a power amplifier (PA) and one or more filters.

Since WLAN relies on a symmetric RF system, the same RF system may be used on access points as used on terminals, e.g., (PCMCIA cards). In WLAN, a symmetric RF system is highly advantageous from cost perspective and secondly from flexibility perspective. No changes to the hardware may be desired when a switch between infrastructure and an adhoc mode is implemented. Such RF system may support a point-to-point as well as point-to-multipoint communications.

For emergency cases, a base station router 110 may provide a stand alone service without backhaul connectivity by storing emergency calls on an Audix, e.g., voice messages may be compressed and stored on a hard disk. Then, the base station router 110 may turn into a high power terminal and reach another base station that the base station router 110 may communicate with. The extended cell range of the base station router 110 beside frequency agility supports standards agility.

In one embodiment, the base station router 110 (in a terminal mode) may lower the data rate to enlarge a cell radius and reach a base station farther away since forwarding of stored voice messages, such as SMS and MMS may not have to be done in real-time. The base station router 110 in the terminal mode may use other air interface protocols to reach a wireless network.

For forwarding voice messages including SMS and MMS, the base station router 110 may comprise a packet satellite/VSAT modem. Moreover, to enable a base station router 110 to distribute special emergency information, the base station router 110 may utilize a storage facility as a play-out center for SMS cell broadcast or for other distribution channels. So when the backhaul infrastructure is destroyed or not working, in case of a newly installed base station router 110 in an emergency incident region, or if no such infrastructure was ever present, the base station router 110 may complete a call.

A user may be informed via an audio announcement that his/her emergency message will be stored and delivered as soon as possible. The base station router 110 may be configured to accept calls without authentication of the user. Thus, all Mobile Country Codes, Mobile Network Codes and Mobile Subscriber Identification Numbers (MSIN) of users may be accepted. In particular, the 3GPP standard compliant handsets may be supported. The 2G handsets may be enabled with a GSM base station router 110 instead of a UMTS base station router 110 or WCDMA handsets with a 3GPP2 base station router 110.

A micro and a pico version of the base station router 110 may be implemented into a small portable box. Thus, the base station router 110 may be used efficiently to establish a fallback non real time wireless network connection usable in case of disasters or other incidents. A wireless network, such as the wireless network 100 other than GSM/UMTS, such as CDMA, TDMA and TETRA may employ the base station router 110 in a similar way. In the base station router 110, a storage capability may store broadcast information remotely via a non real-time link. Users in the emergency area may then receive broadcast information from the base station router 110 even if a real-time backhaul is missing.

In one embodiment, the wireless network 100 may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications.

The UMTS also referred as Wideband Code Division Multiple Access (WCDMA) includes Core Networks (CN) that is packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP2) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of enabling a wireless communication over a network in response to an indication of an emergency, the method comprising:
   in response to a call associated with said emergency, causing a base station to provide a wireless backhaul link in an uplink frequency band for further sending said call over said network;
   accepting said call and associated information even when said network is being off line;
   storing said call and said associated information;
   swapping a transmit frequency band with a receiver frequency band to reconfigure the base station into a terminal;
   forwarding said call over said wireless backhaul link when a fixed wired backbone network link indicates a malfunction, wherein storing said call further comprises:
   detecting whether a link to a backbone network is available; and
   if so, uploading information associated with said call using at least one of a satellite connection, a wireless local area network connection, a WiMAX connection, a UMTS link and a CDMA link to another base station having a backhaul connectivity.

2. A method, as set forth in claim 1, further comprising:
   using a filter to convert a downlink sender of said base station into an uplink sender providing a high-powered terminal that overcomes said malfunction of said fixed wired backbone network link.

3. A method, as set forth in claim 2, further comprising:
   using said filter to cause said base station to use said wireless backhaul link to complete said call instead of using said fixed wired backbone network link.

4. A method, as set forth in claim 3, further comprising:
   enabling a wireless service based on said filter at said base station.

5. A method, as set forth in claim 1, wherein storing said call further comprises:
   storing a voice call on at least one of a local disk and a random access memory.

6. A method, as set forth in claim 1, further comprising:
   delivering said call in non-real time using one of said satellite connections, a wireless local area network connection, a WiMAX connection, a UMTS link and a CDMA link to said another base station.

7. A method, as set forth in claim 1, wherein storing said call further comprises:
   reconfiguring said base station to enable a radio frequency terminal for completing said wireless communication.

8. A method, as set forth in claim 7, wherein reconfiguring said base station further comprises:
   using a transceiver at said base station to swap a transmit frequency band with a receiver frequency band.

9. A method, as set forth in claim 8, wherein reconfiguring said base station further comprises:
   enabling a desired cell range of transmit power for said wireless backhaul link using at least one of a CDMA and UMTS protocol based on uplink budget.

10. A method, as set forth in claim 9, wherein reconfiguring said base station further comprises:
    coupling an antenna to said base station with said transmit power; and
    increasing said desired cell range based on said transmit power.

11. A method, as set forth in claim 9, wherein the method in said emergency further comprises:
    causing said base station to operate in one of a base station mode or a mobile terminal mode based on an indication of frequency change.

12. A method, as set forth in claim 11, wherein reconfiguring said base station further comprises:
    providing all radio frequency related modules in said base station to be frequency agile for enabling said base station to be symmetric in frequency bands.

13. A method, as set forth in claim 12, wherein reconfiguring said base station further comprises:
    supporting at least one of a point-to-point and a point-to-multipoint radio frequency communications.

* * * * *